United States Patent
Kennedy (10) Patent No.: US 8,717,940 B2
(45) Date of Patent: *May 6, 2014

(54) PREDICTIVE MOBILE AD HOC NETWORKING INCLUDING ASSOCIATED SYSTEMS AND METHODS

(75) Inventor: Robert A. Kennedy, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/594,095

(22) Filed: Aug. 24, 2012

(65) Prior Publication Data

US 2012/0322383 A1 Dec. 20, 2012

Related U.S. Application Data

(63) Continuation of application No. 10/989,067, filed on Nov. 15, 2004, now abandoned.

(51) Int. Cl.
*H04L 12/28* (2006.01)
*H04W 4/00* (2009.01)

(52) U.S. Cl.
USPC .......................... 370/254; 370/329; 455/456.1

(58) Field of Classification Search
None
See application file for complete search history.

(56) References Cited

U.S. PATENT DOCUMENTS

| | | | |
|---|---|---|---|
| 5,751,691 A * | 5/1998 | Soumiya et al. ............... | 370/232 |
| 6,067,287 A | 5/2000 | Chung-Ju et al. | |
| 6,563,792 B1 * | 5/2003 | Chang et al. ............... | 370/235.1 |
| 6,791,949 B1 | 9/2004 | Ryu et al. | |
| 6,917,628 B2 | 7/2005 | McKinnin, III et al. | |
| 7,114,001 B2 | 9/2006 | Dettinger | |
| 2003/0005149 A1 | 1/2003 | Haas et al. | |
| 2003/0072289 A1 | 4/2003 | Yuang et al. | |
| 2003/0120809 A1 | 6/2003 | Bellur et al. | |
| 2003/0227873 A1 | 12/2003 | Goldberg | |
| 2004/0063451 A1 * | 4/2004 | Bonta et al. ................... | 455/519 |
| 2004/0185863 A1 * | 9/2004 | Ogami ....................... | 455/452.1 |
| 2004/0198426 A1 * | 10/2004 | Squibbs et al. ............... | 455/555 |
| 2004/0218548 A1 | 11/2004 | Kennedy et al. | |
| 2004/0219909 A1 | 11/2004 | Kennedy et al. | |

(Continued)

FOREIGN PATENT DOCUMENTS

| | | |
|---|---|---|
| EP | 0959582 | 11/1999 |
| EP | 1473879 | 11/2004 |
| KR | 1020020077671 | 10/2002 |

OTHER PUBLICATIONS

Boleng et a., Metrics to Enable Adaptive Protocols for Mobile Ad Hoc Networks, Colorado School of Mines, 6 pages, 2002.

(Continued)

*Primary Examiner* — Chirag Shah
*Assistant Examiner* — Joshua Smith
(74) *Attorney, Agent, or Firm* — Allen, Dyer, Doppelt, Milbrath & Gilchrist, P.A.

(57) ABSTRACT

The mobile ad hoc network (MANET) includes a plurality of wireless mobile nodes and a plurality of wireless communication links connecting the nodes together. A method for operating a MANET includes predicting future-needed network services, network resources and network configurations in the MANET. A network response is predicted, based upon the predicted future-needed network services, network resources and network configurations. The MANET is adjusted based upon the predicted network response before the future-needed network services, network resources and network configurations are actually needed in the MANET.

19 Claims, 4 Drawing Sheets

(56) References Cited

U.S. PATENT DOCUMENTS

| | | | |
|---|---|---|---|
| 2004/0260808 A1 | 12/2004 | Strutt | |
| 2005/0002414 A1 | 1/2005 | Miyaoka | |
| 2005/0063325 A1 | 3/2005 | Kim et al. | |
| 2005/0079886 A1* | 4/2005 | Niwano | 455/522 |
| 2005/0128944 A1 | 6/2005 | Zhang et al. | |
| 2005/0152305 A1 | 7/2005 | Ji et al. | |
| 2006/0239207 A1 | 10/2006 | Naghian | |
| 2006/0268873 A1 | 11/2006 | Tonjes et al. | |
| 2007/0218880 A1* | 9/2007 | Felter et al. | 455/414.1 |

OTHER PUBLICATIONS

Su et al., Mobility Prediction in Wireless Networks, 2000, IEEE, Oct. 22-25, 2000, MILCOM 2000, 21st Century Military Communications Conference Proceedings, vol. 1, pp. 491-493.

Turgut et al., Longevity of Routes in Mobile Ad hoc Networks, Center for Research in Wireless Mobility and Networking (CReW-MaN), Department of Computer Science and Engineering, The University of Texas at Arlington, 5 pages, 2001.

Papadimitratos et al., Path Set Selection in Mobile Ad Hoc Network, MOBIHIOC '02, Jun. 9-11, 2002, EPFL Lausanne, Switzerland, Copyright 2002 AACM 1-58113-501-7/02/006.

Kennedy et al., Psiactive Routing—A New Class of Ad Hoc Network Routing, Wireless Ad-Hoc Networks, International Workshop on OULU Finland, IEEE, May 2004, pp. 18-184.

Shah et al., Predictive Location-Based QoS Routing in Mobile Ad Hoc Networks, University of Illinois at Urbana-Champaign, Department of Computer Science, 21 pages, 2002.

Goff et al., Preemptive Routing in Ad Hoc Networks, 2001 ACM ISBN 1-58113-422, Mar. 1, 2007.

* cited by examiner

PREDICTIVE MOBILE AD HOC NETWORKING INCLUDING ASSOCIATED SYSTEMS AND METHODS

RELATED APPLICATIONS

This application is a continuation of pending Ser. No. 10/989,067 filed Nov. 15, 2004, the entire disclosure of which is hereby incorporated herein by reference.

FIELD OF THE INVENTION

The present invention relates to the field of communication networks, and, more particularly, to mobile ad hoc wireless networks and related methods.

BACKGROUND OF THE INVENTION

Wireless networks have experienced increased development in the past decade. One of the most rapidly developing areas is mobile ad hoc networks. Physically, a mobile ad hoc network includes a number of geographically-distributed, potentially mobile nodes wirelessly connected by one or more radio frequency channels. Compared with other type of networks, such as cellular networks or satellite networks, the most distinctive feature of mobile ad hoc networks is the lack of any fixed infrastructure. The network is formed of mobile nodes only, and a network is created on the fly as the nodes transmit to or receive from other nodes. Mobility can vary from zero distance units per time unit to whatever the upper bound may be placed on the nodes. The network does not in general depend on a particular node and dynamically adjusts as some nodes join or others leave the network.

In a hostile environment where a fixed communication infrastructure is unreliable or unavailable, such as in a battle field or in a natural disaster area struck by earthquake or hurricane, an ad hoc network can be quickly deployed and provide much needed communications. While the military is still a major driving force behind the development of these networks, ad hoc networks are quickly finding new applications in civilian or commercial areas. Ad hoc networks will allow people to exchange data in the field or in a class room without using any network structure except the one they create by simply turning on their computers or PDAs.

As wireless communication increasingly permeates everyday life, new applications for mobile ad hoc networks will continue to emerge and become an important part of the communication structure. Mobile ad hoc networks pose serious challenges to the designers. Due to the lack of a fixed infrastructure, nodes must self-organize and reconfigure as they move, join or leave the network. All nodes could potentially be functionally identical and there may not be any natural hierarchy or central controller in the network. Many network-controlling functions are distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a network has a multihop topology, and this topology changes as the nodes move around.

The Mobile Ad-Hoc Networks (MANET) working group of the Internet Engineering Task Force (IETF) has been actively evaluating and standardizing routing, including multicasting, protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood usually not far away from itself).

Gathering fresh information about the entire network is often costly and impractical. A network needs to adapt to frequent topology changes and with less accurate information. An application that a network is connected to may be time-critical and cannot withstand the delays imposed by a conventional network framework and architecture.

Current MANET architectures are often designed from disjointed pieces of conventional TCP/IP protocols and one or more "conventional" MANET protocols. Here, the word "conventional" refers to non-crosslayer, non-predictive protocols. However, TCP/IP is not designed to handle the pervasive multilayer prediction problems inherent in MANETs. Thus, in conventional architectures, necessary MANET cross-layer interactions such as routing, network management, QoS, mobility management, power management, frequency management, etc. are blocked, and the conventional architecture cannot meet the real-time and accuracy performance requirements.

SUMMARY OF THE INVENTION

In view of the foregoing background, it is therefore an object of the present invention to provide predictive mobile ad hoc networking in which the network predicts and provides a response for future needed network services, resources and configurations.

This and other objects, features, and advantages in accordance with the present invention are provided by a method for operating a mobile ad hoc network (MANET) comprising a plurality of mobile nodes and a plurality of wireless communication links connecting the mobile nodes together. The method includes predicting future-needed network services, network resources and network configurations in the MANET; predicting a network response, based upon the predicted future-needed network services, network resources and network configurations; and adjusting the MANET based upon the predicted appropriate network response before the future-needed network services, network resources and network configurations are actually needed in the MANET.

Predicting future-needed network services, network resources and network configurations may comprise generating descriptive information of the MANET including at least one of physical and operational characteristics of the MANET. Generating descriptive information of the MANET may comprise generating detailed physical and operational characteristics of the MANET, and generating less-detailed physical and operational characteristics of the MANET. Predicting future-needed network services, network resources and network configurations includes using fuzzy logic and a knowledge base of fuzzy if-then rules. Predicting future-needed network services, network resources and network configurations comprises statistical numerical forecasting, such as performing Holt-Winters forecasts.

Predicting the network response may also be based upon non-predicted future-needed network services, network resources and network configurations. The network services include at least one of routing, quality-of-service (QoS), network management, network planning, resource management, security and mobility. Any other network service can also be included in which an interface can be developed to this invention's predictive capabilities. Network resources include at least one of power and frequency. Network configurations include the network topology and the configuration of each individual node in the network.

Another aspect of the present invention is directed to a mobile ad hoc network (MANET) including a plurality of mobile nodes, and a plurality of wireless communication links connecting the mobile nodes together. Each mobile node includes a communications device to wirelessly communicate with other nodes of the plurality of nodes via the wireless communication links, and a controller to operate the mobile node and to route communications via the communications device. The controller of at least one mobile node includes a network predictor to predict a need for future network services, network resources and network configurations in the MANET, and to predict a network response, based upon the predicted future-needed network services, network resources and network configurations. The mobile node communicates within the MANET to adjust the MANET based upon the predicted network response before the future-needed network services, network resources and network configurations are actually needed in the MANET.

The network predictor generates descriptive information of the MANET including at least one of physical and operational characteristics of the MANET. The descriptive information of the MANET may comprise detailed physical and operational characteristics of the MANET, and less-detailed physical and operational characteristics of the MANET. The network predictor preferably uses fuzzy logic, a knowledge base of fuzzy if-then rules and statistical numerical forecasting, such as Holt-Winters forecasts. The network predictor may also predict the network response based upon non-predicted future-needed network services, network resources and network configurations.

The network services include at least one of routing, quality-of-service (QoS), network management, network planning, resource management, security and mobility. The network resources include at least one of power and frequency. The network predictor may predict the future need for network services, network resources and network configurations based upon at least one of mission plans, schedules, planned traffic patterns and network management data.

Another aspect of the present invention is directed to a wireless mobile node for use in a mobile ad hoc network (MANET) comprising a plurality of mobile nodes, and a plurality of wireless communication links connecting the mobile nodes together. The wireless mobile node includes a communications device to wirelessly communicate with other nodes of the plurality of nodes via the wireless communication link, and a controller to operate the wireless mobile node and to route communications via the communications device. The controller includes a network predictor to predict a need for at least one of future network services, network resources and network configurations in the MANET, and to predict a network response, based upon the at least one of predicted future-needed network services, network resources and network configurations. The mobile node communicates within the MANET to adjust the MANET based upon the predicted network response before the at least one of future-needed network services, network resources and network configurations are actually needed in the MANET.

The network predictor generates descriptive information of the MANET including at least one of physical and operational characteristics of the MANET. The descriptive information of the MANET includes detailed physical and operational characteristics of the MANET, and less-detailed physical and operational characteristics of the MANET. The network predictor uses statistical numerical forecasting, such as Holt-Winters forecasts. The network predictor may also predict the network response based upon at least one of non-predicted future-needed network services, network resources and network configurations. The network services include at least one of routing, quality-of-service (QoS), network management, network planning, resource management, security and mobility. The network resources include at least one of power and frequency. The network predictor predicts the future need for network services, network resources and network configurations based upon at least one of mission plans, schedules, planned traffic patterns and network management data.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer or other programmable apparatus implemented process such that the instructions which execute on the computer or other programmable apparatus provide steps for implementing the functions specified in the flowchart block or blocks.

The present invention may make use of the Temporal Transition Network Protocol (TTNP) in a mobile ad hoc network to efficiently make use of the management and control of route discovery and associated processes via temporal transitioning processes and events in a mobile ad hoc network, as described in copending application Ser. No. 10/134,856, filed Apr. 29, 2002 by the same assignee of record and incorporated by reference herein in its entirety. Furthermore, the present invention may make use of "Intelligent Communication Node Object Beacon Framework" (ICBF), for intelligent, adaptive advertisement by any communications node object of its presence and/or the corresponding detection (neighbor discovery) by another node object or the network of those node objects transmitting such beacons as described in copending application Ser. No. 10/235,242, filed Sep. 4, 2002 by the same assignee of record and incorporated by reference herein in its entirety. Also, the present invention may make use of "Predictive Routing Including The Use Of Fuzzy Logic In A Mobile Ad Hoc Network" to provide predictive discovery of routes in a mobile ad hoc network as described in copending application Ser. No. 10/426,580 filed Apr. 30, 2003 by the same assignee of record and incorporated by reference herein in its entirety.

Predictive networking, or more formally referred to herein as Psiactive Networking (ΨNet), is mobile ad-hoc networking in which the network "senses and predicts" a need will occur in the future for network services, resources and configurations which may not presently be needed. Fundamentally, ΨNet fuses key information from multiple adjacent and non-adjacent network layers as is necessary to accomplish reliable prediction of future needed network services, resources and configurations.

ΨNet is an integrated ad hoc networking framework and architecture of ad hoc networking which for handling current networking scenarios with a major predictive capability that fundamentally uses a robust forecasting technique to peer into some future state of the network (or part of the network) to greatly increase the ability of the ad hoc network to timely respond to the entire range of network dynamics from slow to very rapid. Within the ΨNet context, a "forecast" is any intermediate lookahead step and the "prediction" is the result of all steps leading up to the final (predicted) outcome. ΨNet will operate with conventional routing schemes, such as proactive and reactive routing, and/or a hybrid routing scheme such as Temporal Transition Network Protocol (TTNP) or Zone Routing Protocol (ZRP). Proactive schemes include, but are not limited to Optimal Link State Routing and Open Shortest Path First. Reactive (on-demand) schemes include, but are not limited to Ad Hoc On-Demand Distance Vector and Dynamic Source Routing. There are several other routing classification schemes, but in the general sense, most can be fit into one of these three types.

As discussed above, current MANET architectures are designed from disjointed pieces of conventional TCP/IP protocols and other conventional MANET protocols. However, TCP/IP is not designed to handle pervasive multilayer prediction problems inherent in MANETs. Thus, in conventional architectures, necessary MANET cross-layer interactions such as routing, network management, QoS, mobility management, power management, frequency management, etc. are blocked, and the conventional architecture cannot meet the real-time and accuracy performance requirements.

Figure 1:
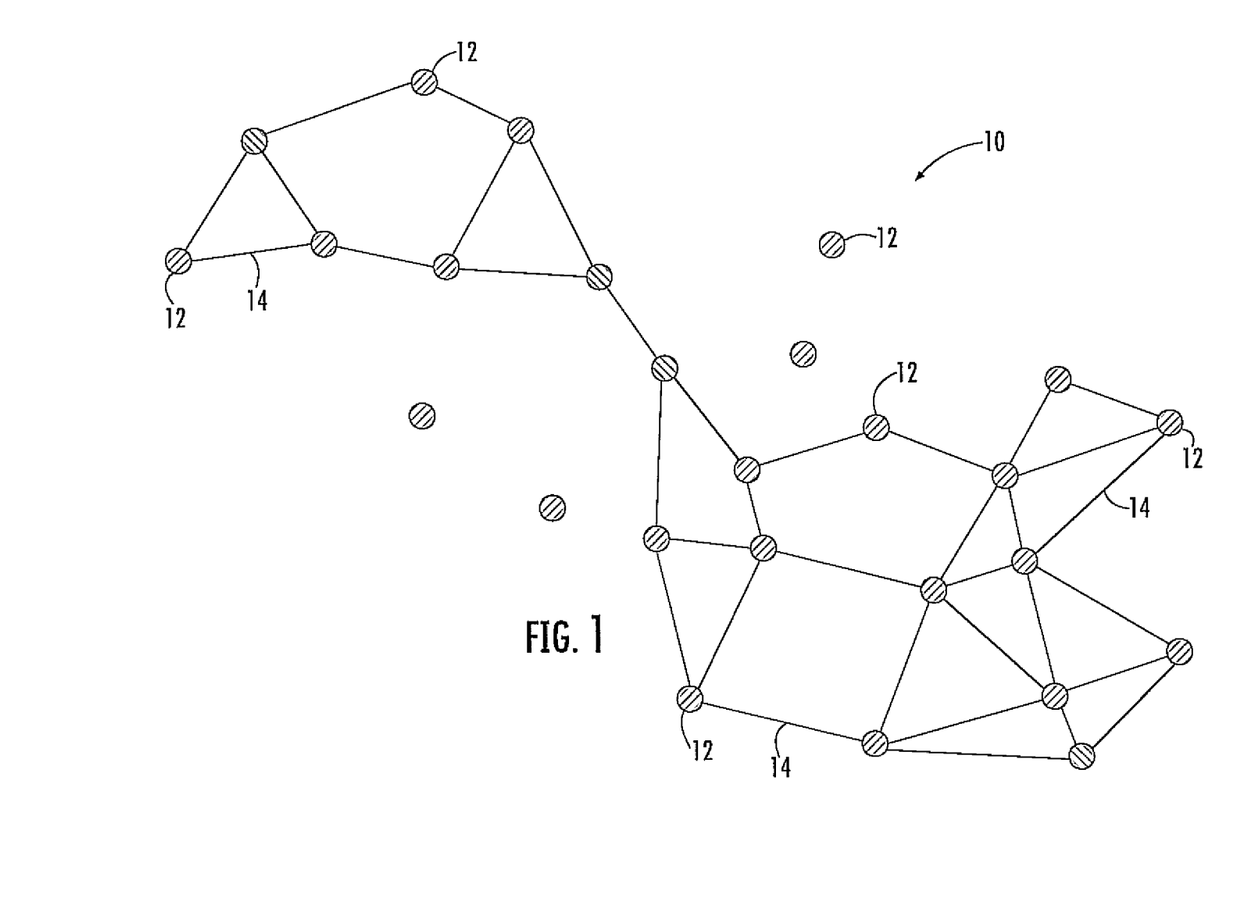
FIG. 1 is a schematic diagram of a mobile ad hoc network in accordance with the present invention.

FIG. 1 is a snapshot of an example network 10 of mobile nodes 12 showing the wireless links 14 connecting nodes. A link 14 is the most atomic connection in a ΨNet network and is simply the physical link between any two nodes 12. A node 12 is the end point of a link 14. Information describing the node includes an ID (IP address, ATM address, etc) and positional information if available.

The application that this network is connected to is time-critical and cannot withstand the delays imposed by a conventional networking approach. Thus, the present invention creates a framework and architecture (generally cross-layer) to optimally unite broad predictive network functions and services, as well as non-predictive network functions and services. Such predictive functions and services include, but are not limited to, routing, QoS, security, mobility management, network management and planning, antenna and radio management, and resource management such as power, frequency etc. Also, the following discussion of the network architecture incorporates a routing-centric default view but other views, such a QoS-centric or security-centric, are also supported.

The general attributes of this new network and method include using application information to predict when, what, why, and where network services and resources will be needed, using predicted dynamics to improve network configurations and robustness, providing for the services, resources and configurations before actually needed, improving the real-time response capability (i.e. a super real-time response) with potentially less overhead, and using ΨNet combined with many conventional MANET protocols. The basic technology approach then breaks into distinct, but interconnected parts: predicting services, resources and configurations that will be required by the application; predicting failures/difficulties in the network; and predicting solutions or responses needed to resolve the network needs and predicted failures/difficulties; and putting in place the proper response to the future needs earlier than they are actually needed.

Fuzzy iterative prediction provides the core predictive function for MANET operations and services. Fuzzy knowledge, described in further detail below, uniquely characterizes the prediction for any given MANET operation or service, and is important to the integration of all network functionality and services. As such, rules can be defined which mix fuzzy variables representing Psiactive functionality and services from multiple traditional network layers to provide a naturally-integrated system. The prediction involves processing the rules concerning multiple network functionality and services and effectively providing top-to-bottom prediction-based network architecture and set of protocols.

Figure 2:
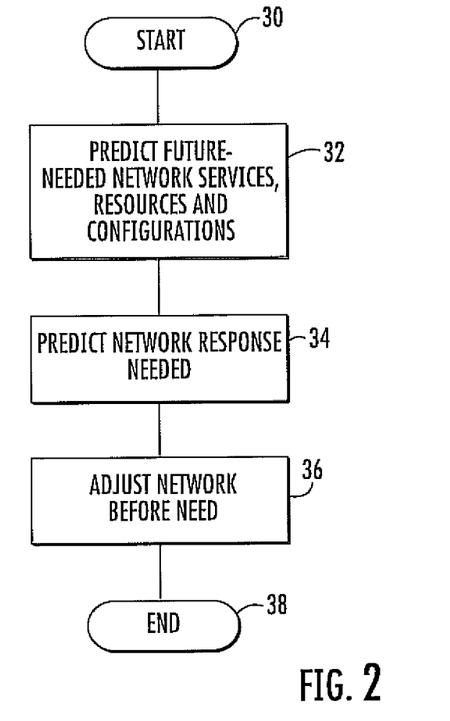
FIG. 2 is a flowchart illustrating the steps of a method for managing and controlling the mobile ad hoc network in accordance with the present invention.

Referring to FIGS. 1 and 2, a method for operating the mobile ad hoc network 10 will now be described. The network 10 includes the plurality of mobile nodes 12, such as laptop computers, personal digital assistants (PDAs) or mobile phones, that are connected by wireless communication links 14 as would be appreciated by the skilled artisan.

The method begins (FIG. 2; block 30) and includes predicting future-needed network services, network resources and network configurations in the MANET 10 (block 32). The network services and resources include routing, quality-of-service (QoS), network management, network planning, resource management, security, mobility, power and frequency management. This prediction step also includes predicting failures/difficulties that will occur in the network. At block 34 a network response is predicted, based upon the predicted future-needed network services, network resources and network configurations. Predicting the network response may also be based upon non-predicted future-needed network services, network resources and network configurations, and includes predicting the response needed to resolve the predicted failures/difficulties. At block 36 the MANET 10 is adjusted based upon the predicted appropriate network response before the future-needed network services, network resources and network configurations are actually needed in the MANET 10, before ending at block 38.

Predicting future-needed network services, network resources and network configurations may comprise generating descriptive information of the MANET 10 including at least one of physical and operational characteristics of the MANET. Generating descriptive information of the MANET 10 may comprise generating detailed physical and operational characteristics of the MANET, and generating less-detailed physical and operational characteristics of the MANET. More specifically, the network prediction uses metrics which combine two types of fuzzy variables. Fuzzy Focus Variables (FFV) provide robust but detailed physical/network, and operational/services, information. Fuzzy Perception Variables (FPV) provide robust but broad, much less detailed, network and services information. Predicting future-needed network services, network resources and network configurations includes using fuzzy logic and a knowledge base of fuzzy if-then rules, and preferably includes statistical numerical forecasting, such as performing Holt-Winters forecasts.

The predictive network and method of the present invention has improved on-time and real-time response, increased traffic throughput, decreased end-to-end delay, and increased network reliability and dependability. These advantages will increase over non-Psiactive Networking approaches as the complexity and dynamics of the MANET increase.

Figure 3:
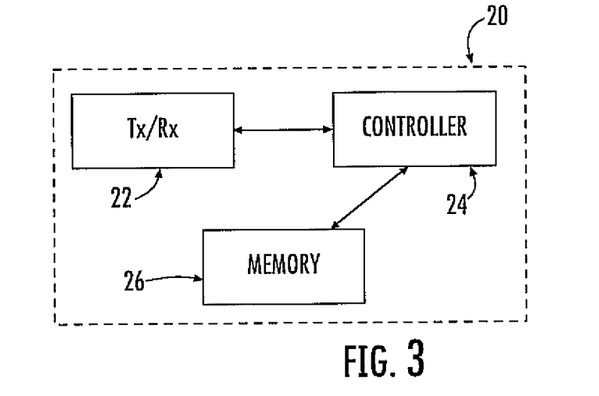
FIG. 3 is a schematic diagram illustrating a router of a node in accordance with the network of the present invention.
Figure 4:
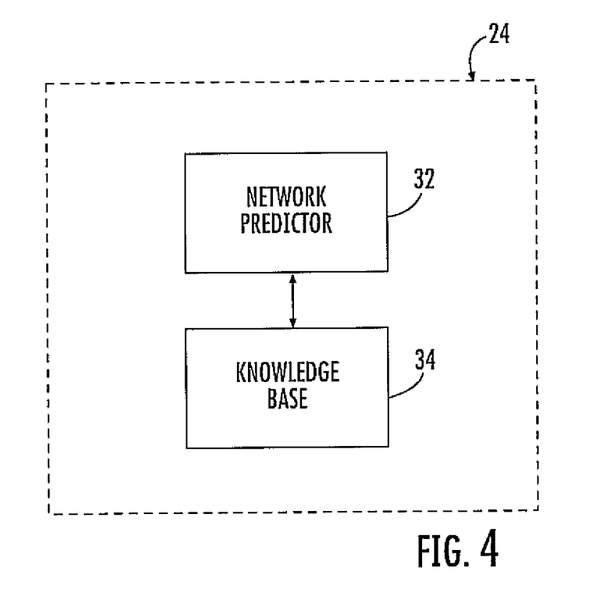
FIG. 4 is a schematic diagram illustrating the details of the controller of the router in FIG. 3.

A system aspect of the invention will now be described with further reference to FIGS. 3 and 4. As discussed, the mobile ad hoc network 10 has a plurality of wireless mobile nodes 12, and a plurality of wireless communication links 14 connecting the nodes together. Each mobile node 12 includes a router 20 that has a communications device 22 to wirelessly communicate with other nodes of the plurality of nodes via the wireless communication links 14. Also, the router includes a controller 24 to route communications via the communications device 22. Also, a memory 26 may be included as part of the controller 24 or in connection with the controller.

The controller 24 of at least one mobile node 12 in the network 10 includes a predictor 32 to predict the need for future network services, network resources and network configurations in the MANET, and to predict a network response, based upon the predicted future-needed network services, network resources and network configurations. The mobile node 12 communicates within the MANET 10 to adjust the MANET based upon the predicted network response before the future-needed network services, network resources and network configurations are actually needed in the MANET.

The network predictor 32 generates descriptive information of the MANET including at least one of physical and operational characteristics of the MANET. The descriptive information of the MANET may comprise detailed physical and operational characteristics of the MANET, and less-detailed physical and operational characteristics of the MANET. The network predictor 32 preferably uses fuzzy logic, a knowledge base 34 of fuzzy if-then rules and statistical numerical forecasting, such as Holt-Winters forecasts. The network predictor 32 may also predict the network response based upon non-predicted future-needed network services, network resources and network configurations.

The network services include at least one of routing, quality-of-service (QoS), network management, network planning, resource management, security and mobility. The network resources include at least one of power and frequency. The network predictor 32 may predict the future need for network services, network resources and network configurations based upon at least one of mission plans, schedules, planned traffic patterns, changing link conditions, network management data and any other relevant network parameters that can be acquired and processed.

The general architecture of ΨNet is built upon the premise of identifying and defining the components of ΨNet such that these components and their external ΨNet parameters are not dependent upon any particular application or general protocol stack. This defined generic set of external ΨNet interface parameters require whatever protocol stack and applications are chosen by the applications systems design to conform to the interface specification. Such conformation could require the specific applications system to create these parameters through a custom parameter conversion or extraction process. The architecture of each major component is kept separate so as to further preserve this independence.

Figure 5:
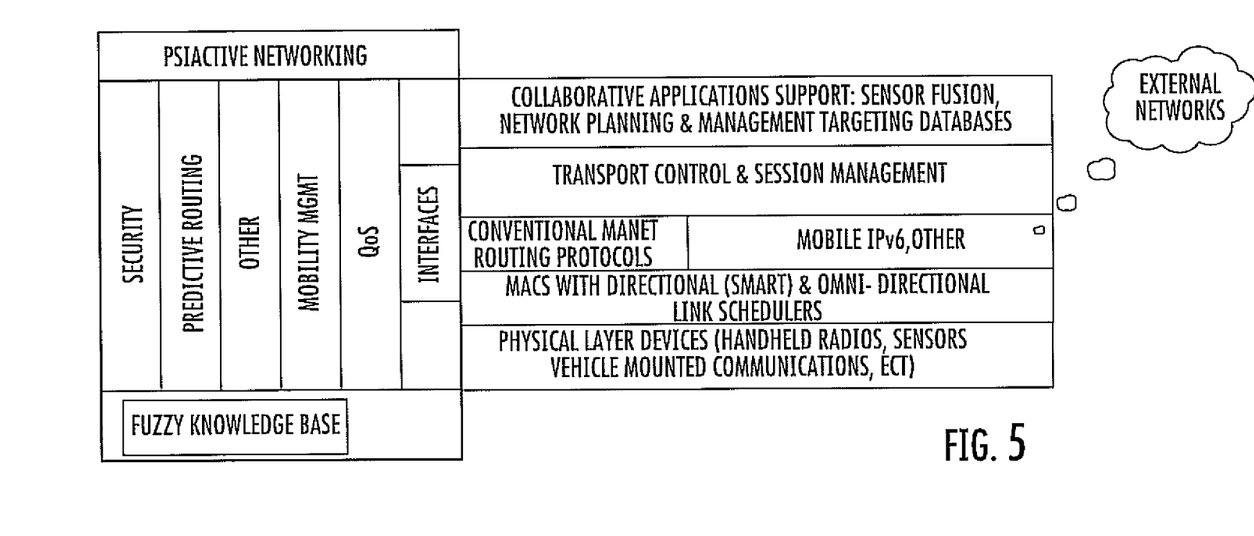
FIG. 5 is a schematic diagram illustrating the general architecture of predictive or Psiactive Networking.

FIG. 5 shows the general architecture of ΨNet including its relationship to a conventional protocol stack. The components include the fuzzy logic-based predictor and various prediction-based network services such as network management, timing, routing, and security. Additionally, many lower level network functions required to support the predictor and the network services. These include, but are not limited to database/knowledge base management and searching, timers, network topology tracking, data conversion, etc.

ΨNet does not explicitly address how any of these components are physically mapped to any given node or subset of nodes. It is the philosophy of ΨNet to leave the physical mappings to the targeted application or to the designer of the network that must support one or more applications. However, one could argue that it is preferable to have all of these components on each node provided the physical resources of the node will support all of these components residing simultaneously on each node and provided there are no other concerns, such as security, about having so much functionality on each node. The requirements, strategies, and reasoning for how fully distributed functionality should be in a network is to be determined by the network designer.

Not all nodes need to be ΨNet predictor-enabled nor, due to potential physical (power, processor type, memory capacity, communications capabilities) or information access limitations, can all nodes necessarily be so enabled. This is one of the justifications that leads to possibly restricting the number of nodes in a ΨNet network with the ΨNet prediction ability. These "advantaged" nodes, called $\Psi_c$ (prediction control nodes), would then be able to make requests to other nodes or itself to get or request resources, services and configurations that are predicted to be needed at some point in the future.

There are a number of basic requirements that should be met for this predictor to be effective in a general MANET environment. There is no particular ordering the following list.

1. A predictor must be on-time implementable.
   A real-time implementation that keeps up with every microchange in the network is not in general necessary. On-time becomes real-time in the few cases in which these microchanges are critical.
   Improved hardware and bandwidth may help in specific applications, but not in the broadest sense of applicability.
2. A broadly applicable predictor must not require the collection of a lot of data (<100 data points) before being able to make-a reliable prediction.
   This is more than just a real-time consideration. Collecting a lot of data would often not even be possible because all meaningful collection could frequently occur only over a few data points.
   The collection of a large quantity of such data simultaneously by many nodes in the network could result in too much overhead and threaten the available data bandwidth and timely response of the network.
3. A predictor must be robust in that it can issue reliable predictions even when relevant network conditions are "somewhat" outside the norm that the designer expects.
4. Predictors need not necessarily be complex, but the behavior of a predictor itself must stay within the bounds of acceptable predictability of the applications they serve.
5. The technology foundation of this strategic, fundamental predictor must be robust enough to function well regardless of the priority ordering of the above requirements in this list.
   This priority ordering could vary from application to application.

Candidates for the predictors for problems of a dynamically-changing MANET could be based on fuzzy logic, decision trees, rule induction or combinations of these. Nonparametric statistical or deterministic analysis is used to preprocess the data before sending to the actual predictor.

Based on the requirements outlined in section above, the ΨNet predictor method uses a fuzzy rule-based approach. In a general application of ΨNet, multiple types of parameters (metrics) are used as input to ΨNet's predictor. These metrics consist of data such as link quality data, location information, security levels, etc. Psiactive Networking's fuzzy logic approach enables predictions based on multiple types of data and knowledge (also called metrics) to be reliably accomplished without encountering as many intractable computational and decision convergence problems as would be encountered using a non-fuzzy computational approach.

ΨNet predictor is composed of nine components.
These components are:
1. Database
2. Sampling and Database Update and Tactics
3. Knowledge Base Sampling and Knowledge Base Update and Tactics
4. Statistical Numerical Forecasts
5. Information Structure Interface
6. Fuzzifier
7. Reasoning Engine
8. Defuzzifier The database includes data-sets which are collected during the actual operation of the network and data which is preconfigured into the database. The database typically contains information that is typically descriptive of physical or operational characteristics of the network. Preconfigured data may be constants or default values for physical characteristics of nodes. The data may be either numerical or textual in form. Much of the information in the database is retrieved from and relevant to the physical and application layers. The following is a sample list of information that could be acquired when possible and placed into this database to facilitate more accurate and useful predictions. Any subset, superset or an entirely different set of parameters could be used as applicable to a given Psiactive Network instantiation.

1. Initial number of nodes in the network;
2. Maximum number of nodes allowed in the network (irregularly, if ever sampled);
3. Location of each node (frequently sampled);
4. Maximum possible or permitted speed of each node
5. ID of each node—often an IPv4/v6 or ATM address (sampled);
6. Allowed power capacity of each node for communications
7. Node communications power utilization rate; Current remaining power capacity for communications (sampled);
9. Expected locations of nodes at planned times;
10. Probability associated with each of the expected locations of nodes at the planned times;
11. Predetermined pairs or groups of nodes that are planned to be in communication with each other at various times;
12. Predefined movement patterns of nodes;
13. Planned removal of nodes from service;
14. Planned activation of nodes into service;
15. Predetermined required source routing paths;
16. Permitted location boundary of a node's movement;
17. Node movement rate—speed and acceleration (frequently sampled);
18. Node transmit distance;
19. Node receive distance;
20. Antenna type (omnidirectional, directional, unidirectional);
21. Current pointing direction (if directional) of antenna;
22. Planned future antenna pointing directions;
23. Link quality (stability, reliability, availability, etc).

The sampling strategy must support the database update requirements for the types of information collected and the validity of the information. Typical types of information are the items identified as "sampled" in the list of database information types above. The need for many nodes to hold large databases and sample information across the network can consume a significant percentage of the needed total network bandwidth, occupy too much of a node's memory and drain a node's power reserve. Therefore, "right-sizing" the database is critical as are the tactics for the efficient and timely synchronization of databases across multiple nodes.

Node position data is acquired by two types of sampling mechanisms with each mechanism sampling at two different timescales or frequencies (low frequency, low resolution position and high frequency, high resolution position). The first sampling mechanism uses a route discovery technique to acquire relative node positions at link-level resolution. The second sampling mechanism uses coordinate position data transmitted directly by either the node that the position data applies to or by another node that is designated to transmit its position data for other nodes in the network.

Each node can independently collect data and store it in its local database. Generally, each node node's database is not only different from other nodes' databases in the numerical values of data items, but also in the types of data items collected. Since ΨNet will in general need to obtain information contained in the databases of other nodes on some scheduled basis in order to make intelligent, informed predictions, it is essential that the databases be synchronized with each other as necessary to ensure the integrity of the data. This means that some of the needed database may be distributed among many nodes to save on local node memory resources, while other information must be duplicated across selected subsets of nodes. The updating of this duplicated data is generally done at some rate independent of any particular access by nodes in order to maintain real-time prediction throughput.

The ΨNet knowledge base consists of the following general categories of knowledge-encoded information: General system fuzzy If-Then rules; Applications specific fuzzy If-Then rules; Middleware fuzzy If-Then rules; Meta Rules (rules that specify knowledge about other knowledge and types of rules); Sampling strategy used to populate the database; and Tactics used to synchronize databases across multiple nodes.

The Statistical Numerical Forecasts component of ΨNet defaults to using the Holt-Winters extension to the classic exponentially weighted moving average (EWMA) univariate forecasting procedure to produce the numerical forecasts (predictions) calculated at various timescales. Other statistical numerical forecasting techniques could be used as necessary without altering the architecture or processing flow of ΨNet. Techniques such as Holt-Winters and EWMA are "ad hoc" techniques because no proper statistical model is associated with these types of techniques. Nevertheless, such forecasting methods have proven to be very useful and practical in practice. The results from each timescale serves as a separate numerical input into the overall ΨNet prediction. For simplicity, only two timescales are utilized resulting in statistical numerical forecasts that serve as two of the three major inputs into a fuzzification mapping. If sufficient computational power is available at the prediction nodes along with sufficient real-time or on-time data inputs to these prediction nodes, then the number of timescales (multiple timescale granularities) could be increased to improve prediction results as may be required by the application.

The following is the set of equations used for the Holt-Winters forecasts for any timescale.

$$\hat{Y}_{t+P|t} = M_t + B_t P + C_{t+P|t} \quad P=1, 2, \ldots \tag{1}$$

$$M_t = \lambda_0 Y_t + (1-\lambda_0)(M_{t-1} B_{t-1}) \tag{2}$$

$$B_t = \lambda_1 (M_t M_{t-1}) + (1-\lambda_1) B_{t-1} \tag{3}$$

$$C_t = \lambda_P (Y_t - M_t) + (1-\lambda_P) C_{t-P} \quad 0 < \lambda_0, \lambda_1, \lambda_P \leq 1 \tag{4}$$

$\hat{Y}_{t+P|t}$ is the prediction of future observations P time periods from the current time t period given the value of $M_t$, which is the prediction for the current value of Y at time t or $Y_t$. $B_t$ is the slope of the prediction equation which is interpreted to mean the local linear trend of the data series. $C_t$ is the "seasonal".component that in this case is considered to be additive in nature. Some seasonal components may be multiplicative in nature and therefore equation (1) would change to reflect this multiplicative nature. For discussion, the additive case is assumed. $\lambda_0, \lambda_1, \lambda_P$ are smoothing constants in the range specified above. These recursive equations permit the reuse of results from one time period earlier to calculate the current time period results for each of the above equations.

Fundamentally, ΨNet does not restrict the acquisition and analysis of data to the time domain. ΨNet may also be formulated in the frequency domain, but that means changing from the Holt-Winters set of equations to an equivalent set in the frequency domain. This is not discussed in this document since the time domain captures the essence of any formulation of ΨNet needed to present the concepts and functions of ΨNet.

The ΨNet fuzzifier takes numerical information from the SNF and the knowledge base and maps them into a "fuzzy" space described by fuzzy sets. In a real world dynamic network, especially a MANET, the prediction problem will usually have some nonstatistically-quantifiable vagueness either in the target prediction itself or in the intermediate forecasts needed to arrive at the target prediction. For instance, mission plans may specify that at some given future time, it will be necessary to establish a route between a certain $(S_n, D_n)$ pair. The difficulty becomes how to specify the position and connectivity of nodes which would be candidates as the intermediate nodes in this route at the specified future time given a complex, many-body interaction problem. In other words, this problem has a very specific goal but to get there, the network must utilize vaguely-knowable future node, link and system state information.

Approaches such as statistical processing, including ad hoc methods like Holt-Winters, and conventional rule-based systems produce results which are too "brittle" to handle such problems. Brittleness is the opposite of robustness and therefore violates the previously-discussed rule which requires any predictor to be robust in its ability to handle vague specification of network conditions, intermediate and partial network solutions, network policies & goals, and any other vaguely-specifiable and relevant quantity or quality. The present invention proposes to formulate this problem in fuzzy space with the appropriate fuzzy logic operators which together handle this type of vagueness and overcome the brittleness of more conventional approaches.

The fuzzy space mapping and fuzzy logic operations are used for the computation of information and for the formulation/evaluation of production rules. The net effect is to enable ΨNet to be more robust in its predictions than possible otherwise. Mathematically rigorous fuzzy logic is applied to combine inputs and produce the appropriate outputs. Other advantages of fuzzy logic are that it requires minimal computational and memory resources and can be readily backtracked to understand how the results were obtained.

The functions of the Reasoning Engine are to evaluate the fuzzy production rules and to fuse multiple rules' outputs into a single fuzzy set. These rules may fire as a result of the inputs from each or a precombined timescale. Unlike conventional reasoning engines, the output from a fuzzy reasoning engine will typically be far less brittle than that produced by its conventional counterpart.

The Defuzzifier is responsible for mapping the output of reasoning engine into a numerical value, range or set of values which is then the proper prediction to be used by the applicable ΨNet functions and services.

The following is a list of potential information that Wet could use dependent on the need, that is derived from the applications, datalink and physical layers: Expected locations of nodes at planned times; Probability associated with each of the expected locations of nodes at the planned times; Predetermined pairs or groups of nodes that will be in communication with each other at planned times; Predefined movement patterns of nodes; Planned removal of nodes from service; Planned activation of nodes into service; Predetermined required source routing paths; Permitted location boundary of a node's movement; Node movement rate; Node transmit and receive distances; Remaining life of node power source; Antenna type (omnidirectional, directional, unidirectional); Traffic congestion statistics; Current pointing direction (if directional) of antenna; Planned future antenna pointing directions; and Link quality (stability, reliability, availability, etc). Many other types of data and knowledge not listed here could be used as is applicable. Other protocol stacks may have different places in the stack to acquire the data and knowledge list above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for operating a mobile ad hoc network (MANET) comprising a plurality of mobile nodes and a plurality of wireless communication links connecting the mobile nodes together, the method comprising:
predicting future-needed network services, network resources and network configurations in the MANET using statistical numerical forecasting, fuzzy logic and a knowledge base of fuzzy if-then rules which includes using prediction metrics combining Fuzzy Focus Variables (FFV) that provide descriptive information of the MANET defined by detailed physical and operational characteristics of the MANET, and Fuzzy Perception Variables (FPV) that provide descriptive information of the MANET defined by less-detailed physical and operational characteristics of the MANET;
predicting a network response, based upon the predicted future-needed network services, network resources and network configurations; and
adjusting the MANET based upon the predicted network response before the future-needed network services, network resources and network configurations are actually needed in the MANET.

2. A method according to claim 1 wherein predicting future-needed network services, network resources and network configurations includes integrating network services, network resources and network configurations using the fuzzy knowledge base and the fuzzy logic.

3. A method according to claim 2 wherein fuzzy logic includes the use of at least one of fuzzification, fuzzy reasoning and defuzzification.

4. A method according to claim 1 wherein the statistical numerical forecasting comprises performing Holt-Winters forecasts.

5. A method according to claim 1 wherein predicting the network response is also based upon non-predicted needed network services, network resources and network configurations.

6. A method according to claim 1 wherein the network services include at least one of routing, quality-of-service (QoS), network management, network planning, resource management, security and mobility.

7. A method according to claim 1 wherein the network resources include at least one of power and frequency.

8. A mobile ad hoc network (MANET) comprising:
a plurality of mobile nodes;
a plurality of wireless communication links connecting the mobile nodes together;
each mobile node comprising
a communications device to wirelessly communicate with other nodes of the plurality of nodes via the wireless communication links, and
a controller to operate the mobile node and to route communications via the communications device;
the controller of at least one mobile node comprising a network predictor to predict a need for future network services, network resources and network configurations in the MANET using statistical numerical forecasting, fuzzy logic and a knowledge base of fuzzy if-then rules which includes using prediction metrics combining Fuzzy Focus Variables (FFV) that provide descriptive information of the MANET defined by detailed physical and operational characteristics of the MANET, and Fuzzy Perception Variables (FPV) that provide descriptive information of the MANET defined by less-detailed physical and operational characteristics of the MANET, and to predict a network response, based upon the predicted future-needed network services, network resources and network configurations;
the at least one mobile node communicating within the MANET to adjust the MANET based upon the predicted network response before the future-needed network services, network resources and network configurations are actually needed in the MANET.

9. The network according to claim 8 wherein the statistical numerical forecasting comprises the use of Holt-Winters forecasts.

10. The network according to claim 8 wherein the network predictor predicts the network response also based upon non-predicted needed network services, network resources and network configurations.

11. The network according to claim 8 wherein the network services include at least one of routing, quality-of-service (QoS), network management, network planning, resource management, security and mobility.

12. The network according to claim 8 wherein the network resources include at least one of power and frequency.

13. The network according to claim 8 wherein the network predictor predicts the future need for network services, network resources and network configurations based upon at least one of mission plans, schedules, planned traffic patterns and network management data.

14. A wireless mobile node for use in a mobile ad hoc network (MANET) comprising a plurality of mobile nodes, and a plurality of wireless communication links connecting the mobile nodes together, the wireless mobile node comprising:
a communications device to wirelessly communicate with other nodes of the plurality of nodes via the wireless communication links; and
a controller to operate the wireless mobile node and to route communications via the communications device, the controller comprising a network predictor to predict a need for at least one of future network services, network resources and network configurations in the MANET using statistical numerical forecasting, fuzzy logic and a knowledge base of fuzzy if-then rules which includes using prediction metrics combining Fuzzy Focus Variables (FFV) that provide descriptive information of the MANET defined by detailed physical and operational characteristics of the MANET, and Fuzzy Perception Variables (FPV) that provide descriptive information of the MANET defined by less-detailed physical and operational characteristics of the MANET, and to predict a network response, based upon the at least one of predicted future-needed network services, network resources and network configurations;
the communications device and controller communicating within the MANET to adjust the MANET based upon the predicted network response before the at least one of future-needed network services, network resources and network configurations are actually needed in the MANET.

15. The wireless mobile node according to claim 14 wherein the statistical numerical forecasting comprises the use of Holt-Winters forecasts.

16. The wireless mobile node according to claim 14 wherein the network predictor predicts the network response also based upon at least one of non-predicted needed network services, network resources and network configurations.

17. The wireless mobile node according to claim 14 wherein the network services include at least one of routing, quality-of-service (QoS), network management, network planning, resource management, security and mobility.

18. The wireless mobile node according to claim 14 wherein the network resources include at least one of power and frequency.

19. The wireless mobile node according to claim 14 wherein the network predictor predicts the future need for network services, network resources and network configurations based upon at least one of mission plans, schedules, planned traffic patterns and network management data.

* * * * *